United States Patent
Lee et al.

(10) Patent No.: US 8,644,234 B2
(45) Date of Patent: Feb. 4, 2014

(54) WIRELESS DEVICE FOR SELECTING CONNECTION TARGET BASED ON SIGNAL QUALITY, SYSTEM AND METHOD THEREOF

(75) Inventors: Shih Chang Lee, New Taipei (TW); Chien Han Liao, New Taipei (TW)

(73) Assignee: Moxa Inc., New Taipei (TW)

( * ) Notice: Subject to any disclaimer, the term of this patent is extended or adjusted under 35 U.S.C. 154(b) by 252 days.

(21) Appl. No.: 13/177,516

(22) Filed: Jul. 6, 2011

(65) Prior Publication Data

US 2013/0010616 A1    Jan. 10, 2013

(51) Int. Cl.
*H04W 4/00*    (2009.01)

(52) U.S. Cl.
USPC .................. 370/329; 370/338; 370/341

(58) Field of Classification Search
None
See application file for complete search history.

(56) References Cited

U.S. PATENT DOCUMENTS

| | | | |
|---|---|---|---|
| 2004/0166857 A1* | 8/2004 | Shim et al. | 455/436 |
| 2005/0185632 A1* | 8/2005 | Draves et al. | 370/351 |
| 2006/0073847 A1* | 4/2006 | Pirzada et al. | 455/556.2 |
| 2007/0270171 A1* | 11/2007 | Wentink | 455/515 |
| 2008/0205308 A1* | 8/2008 | Prehofer et al. | 370/310 |
| 2009/0274093 A1* | 11/2009 | Senouci et al. | 370/328 |
| 2010/0150063 A1* | 6/2010 | Lee et al. | 370/328 |

* cited by examiner

*Primary Examiner* — Chi Pham
*Assistant Examiner* — Soon-Dong D Hyun
(74) *Attorney, Agent, or Firm* — Chih Feng Yeh; Huntington IP Consulting Co., Ltd.

(57) ABSTRACT

A wireless device for selecting a connection target based on signal quality, a system and a method thereof are provided. The invention selects a candidate device having the best signal quality and duration of the signal quality is not less than a threshold reaching a certain time. If the selected candidate device also selects the wireless device, a unique connection is established between the wireless device and the candidate device. In a dynamical and complicated environment, the disclosed system and the method can build up a stable linear topology through automatic negotiation among wireless devices. The invention then achieves the effect of updating topology in time to adapt to environment changes.

20 Claims, 9 Drawing Sheets

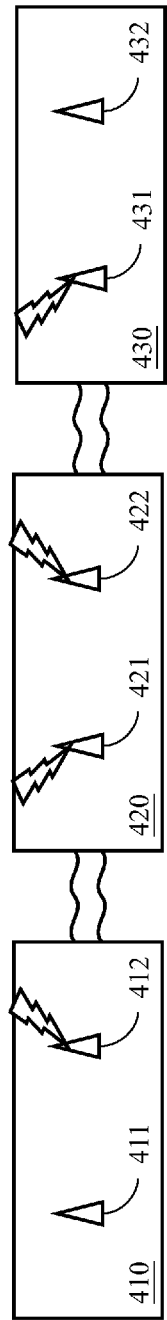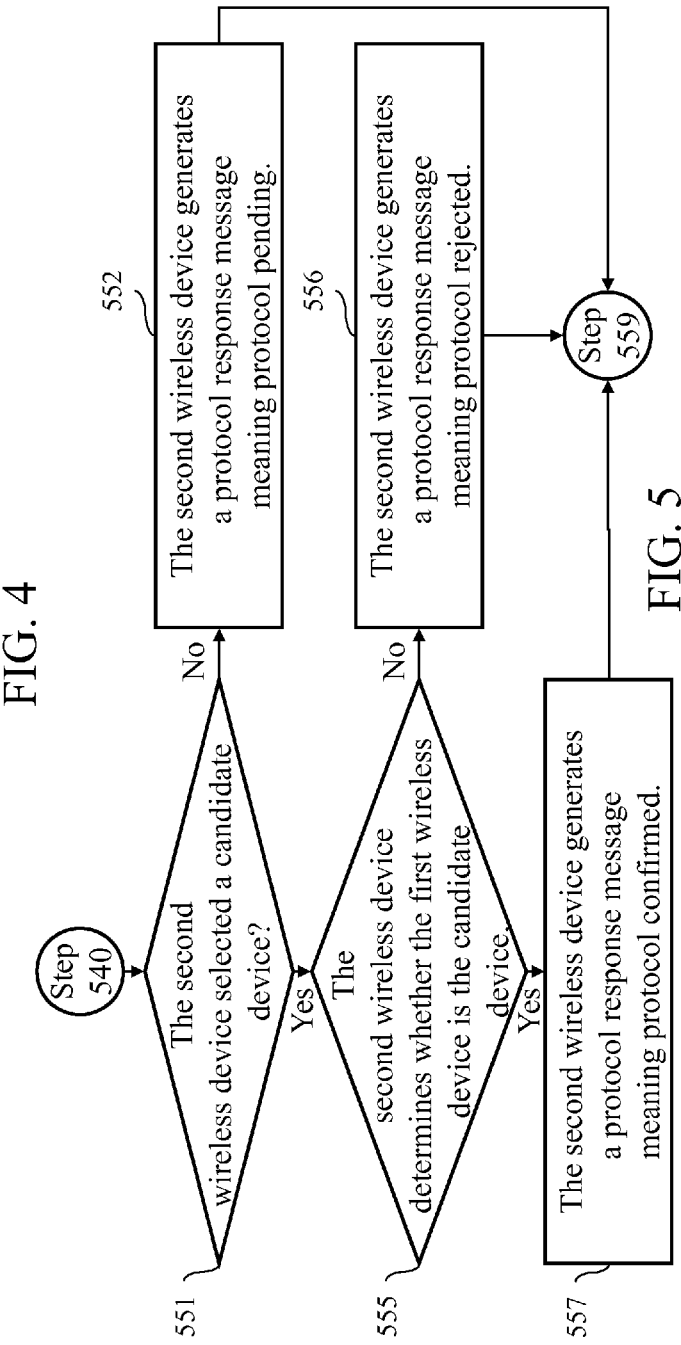

WIRELESS DEVICE FOR SELECTING CONNECTION TARGET BASED ON SIGNAL QUALITY, SYSTEM AND METHOD THEREOF

BACKGROUND OF THE RELATED ART

1. Technical Field

The invention relates to a wireless device, system, and method of establishing a connection, in particularly, to a wireless device that selects a connection target to connect based on signal quality and the system and method thereof.

2. Related Art

Wireless network is designed to allow any station connecting to any AP with same network identity. Due to this attribute, it is impossible to specify the connecting target of station while there are multiple APs with same identity. Therefore, to establish a pre-designed network topology, network identity of each wireless connection must to be independent.

Currently, the most intuitive method to establish a pre-designed linear network topology is to manually configure all network identities as mentioned above. It is only acceptable for simple environment and static topology, e.g., backbone network. However, for certain wireless network application, e.g., railway application, the linear topology is dynamic and could be changed at anytime. For such scenario, dynamic topology update is required. As the result, manual configuration method is not acceptable anymore.

In summary, the prior art cannot automatically build up a stable linear topology compliant with relative positions of stations and APs in a dynamical and complicated environment. It is necessary to provide a better solution.

SUMMARY

In view of the foregoing, the invention discloses a wireless device that automatically selects a connection target based on signal quality without manual modifications. The invention also discloses the system and method thereof.

The disclosed system of selecting a connecting target based on signal quality includes: a first wireless device and a second wireless device. The first wireless device detects signal quality of all wireless devices. It further selects a target device having the best signal quality, and duration of the signal quality between the target device and the first wireless device is not less than a threshold reaching a first specific time. The first wireless device transmits a request packet containing a protocol request message. The second wireless device is a target device for detecting signal quality of all wireless devices. It selects a candidate device having the best signal quality and duration of the signal quality between the candidate device and the second wireless device is not less than a threshold reaching the first specific time. The second wireless device receives the protocol request message sent from the first wireless device. After generating the corresponding protocol response message according to whether the candidate device is the first wireless device, a response packet containing the protocol response message is sent back to the first wireless device. If the second wireless device determines that the first wireless device is the candidate device, the protocol response message is a protocol confirmation. If the second wireless device determines that the first wireless device is not the candidate device, the protocol response message is a protocol rejection. If the second wireless device has not found the candidate device, the protocol response message is protocol pending. After checking the protocol response message means protocol confirmation, the first wireless device establishes a connection with the second wireless device. After checking the protocol response message means protocol rejection, the first wireless device prevents selecting the second wireless device as the target device for a certain time, and continuously selects a new target device as the second wireless device. After checking the protocol response message means protocol pending, the first wireless device waits for a certain time, and then resends the request packet to the currently selected second wireless device.

The disclosed wireless device of selecting a connection target based on signal quality includes: a signal quality detecting module, a target selecting module, a transmitting module, a response generating module, and a connection processing module. The signal quality detecting module detects signal quality of all other wireless devices. The target selecting module selects as a candidate device a wireless device having best quality and duration of the signal quality between the candidate device and the wireless device is not less than a threshold reaching the first specific time. The transmitting module transmits a first request packet containing a first protocol request message to the candidate device, receives a first response packet containing a first protocol response message sent from the candidate device, receives a second request packet containing a second protocol request message, and returns a second response packet containing a second protocol response message. The response generating module generates a second protocol response message for protocol confirmation after determining the wireless device transmitting the second request packet as the candidate device, or generates a second protocol response message for protocol rejection after determining the wireless device transmitting the second request packet as not the candidate device, or generates a second protocol response message for protocol pending if no candidate device is selected. The connection processing module establishes a connection with the candidate device transmitting the first protocol confirmation message after checking the first protocol response message as protocol confirmation. If the first protocol response message is protocol rejection, the signal quality detecting module deletes the record of the signal quality of the candidate device, or the target selecting module prevents selecting the wireless device transmitting the first protocol response message as the candidate device, for a certain time. If the first protocol response message is protocol pending, the connection processing module waits for a certain time, and then resends the first request packet via the transmitting module to the candidate device currently selected by the target selecting module.

The disclosed method of selecting a connection target based on signal quality includes the steps of: using a first wireless device to detect signal quality of all other wireless devices; using the first wireless device to select from the other wireless devices a second wireless device having best signal quality and a duration of signal quality between the second wireless device and the first wireless device is not less than a threshold reaching a first specific time; sending a request packet containing a protocol request message from the first wireless device to the second wireless device; using the second wireless device to select from the other wireless devices a candidate device having best signal quality and a duration of signal quality between the candidate device and the second wireless device is not less than a threshold reaching the first specific time; using the second wireless device to generate a protocol response message according to whether the first wireless device is the candidate device; sending a response packet containing a protocol response message from the second wireless device to the first wireless device; and establishing a connection between the first wireless device and the second wireless device after the first wireless device checks the protocol response message as protocol confirmation.

The disclosed system, wireless device and method differ from the prior art in that the invention uses the wireless device to select a candidate device having best signal quality and a duration of signal quality between the candidate device and the wireless device is not less than a threshold reaching a specific time. The two wireless devices can establish a connection only if the selected candidate device also selects the wireless device. This solves the problems in the prior art, relative-position forming, dynamically updating, and stabilizing the linear topology without manual modifications.

BRIEF DESCRIPTION OF THE DRAWINGS

The invention will become more fully understood from the detailed description given herein below illustration only, and thus is not limitative of the present invention, and wherein:

FIG. 4 is a schematic view of the configuration of wireless devices in the embodiments.

FIG. 5 is a flowchart of generating the protocol response message according to the invention.

DETAILED DESCRIPTION OF THE INVENTION

The present invention will be apparent from the following detailed description, which proceeds with reference to the accompanying drawings, wherein the same references relate to the same elements.

The invention allows a wireless device to quickly determine the most suitable connection target device and automatically connect to the target device. Without modifying any connection parameter of the wireless device, the wireless network topology using the invention can be stabilized. Generally speaking, the wireless devices referred herein are applied to establish a linear topology. However, the invention is not restricted to this possibility only.

Figure 1:
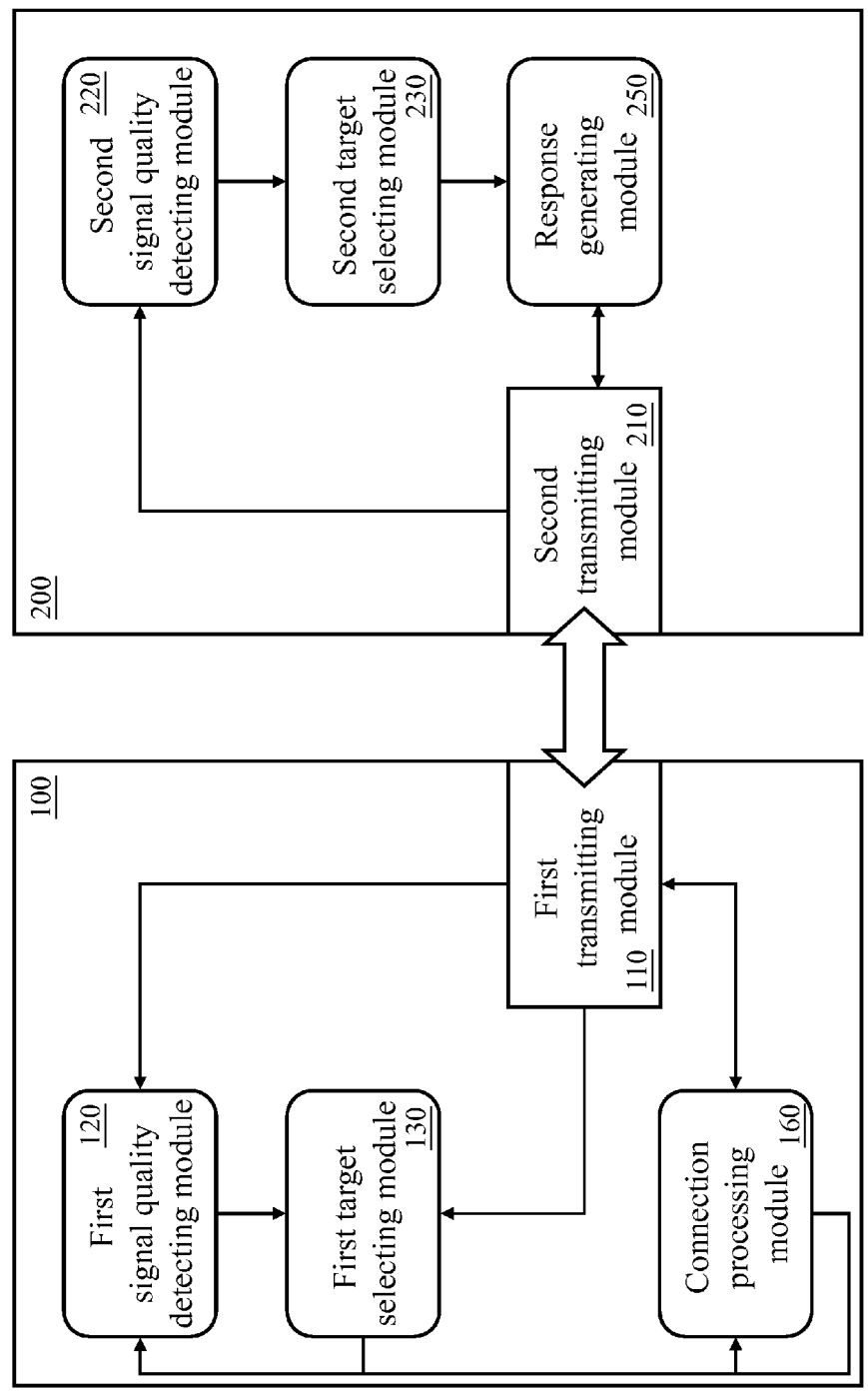
FIG. 1 shows the system for selecting a connection target based on signal quality according to the invention.

To utilize the invention, the wireless network environment must have at least two disclosed wireless devices. FIG. 1 shows the structure of the disclosed system of the invention. As shown in the drawing, the disclosed system includes a first wireless device 100 and a second wireless device 200. In practice, any wireless device of the invention is equipped with the capabilities of all modules in the first wireless device 100 and the second wireless device 200 simultaneously.

To find out the most suitable target device (the second wireless device 200 in FIG. 1) and to establish connection with it, the first wireless device 100 includes a first transmitting module 110, a first signal quality detecting module 120, a first target selecting module 130, and a connection processing module 160.

The first transmitting module 110 transmits and receives wireless packets, including but not limited to probe or beacon packets. This behavior is the same as conventional wireless devices. The first transmitting module 110 also transmits a first request packet containing a protocol request message to the target device, and receives a first response packet returned from the target device.

The first signal quality detecting module 120 evaluates and records signal quality of all other wireless devices in the wireless network, based on the wireless packet received by the fist transmitting module 110. The signal quality detected by the first signal quality detecting module 120 can be the received signal strength indicator (RSSI). However, the invention is not limited to this example. Any data that can be used to determine signal quality can be employed.

The first target selecting module 130 selects one target device from the wireless devices recorded by the first signal quality detecting module 120, such as the second wireless device 200. The wireless device selected as the target device by the first target selecting module 130 has to satisfy three conditions. First, the signal quality of the target device must have the best signal quality among all wireless devices detected by the first signal quality detecting module 120. Secondly, the signal quality of the target device has to be greater than or equal to a threshold. Thirdly, the duration of the signal quality of the target device is not less than a threshold has to reach a specific time. In this specification, a 'first specific time' refers to the required duration for the signal quality of the wireless device to be not less than the threshold.

In order to find out the target device, a table is created by the first target selecting module 130 to record the ID code, signal quality, and duration of wireless devices whose signal quality is not less than a threshold. Among these records, the first target selecting module 130 always check the duration of the record having the best signal quality. If its duration has reached the first specific time, the first target selecting module 130 selects one of the devices of the record as target device (e.g., the second wireless device 200).

After the first target selecting module 130 selects the target device, the connection processing module 160 transmits a first request packet containing a protocol request message via the first transmitting module 110 to the target device. Then the connection processing module 160 receives a first response packet containing a protocol response message returned from the target device.

If the protocol response message contained in the first response packet means 'protocol confirmed', then the connection processing module 160 connects to the target device via the first transmitting module 110. In order to determine whether to actively connect to the target device or passively wait for the connection from the target device, the connection processing module 160 utilizes the device information recorded in the first response packet. The device information referred herein is information that can represent the wireless device, such as the MAC address thereof. However, the device information is not limited to the MAC address. If the device information is the MAC address, the connection processing module 160 can compare the MAC address of the first wireless device 100 and the MAC address of the target device. When the connection processing module 160 determines that the MAC address of the former is larger, the connection processing module 160 actively connects to the target device. When the connection processing module 160 determines that the MAC address of the former is smaller, the connection processing module 160 passively waits the connection from the target device. However, the determining rule used by the connection processing module 160 can be adjusted according to the device information of use, and is not limit to the rule mentioned above.

If the protocol response message means 'protocol rejected', the first wireless device 100 prevents selecting same device as target device for a certain time. The prevention method includes, but not limited in, notifying the first signal quality detecting module 120 to ignore the target device for a certain time while detecting the signal quality, or notifying the first target selecting module 130 to prevent selecting the same device as target device for a certain time.

If the protocol response message means 'protocol pending', then the connection processing module 160 waits for a certain time and then sends the first request containing the first protocol request message via the first transmitting module 110 to the target device currently selected by the first target selecting module 130. It should be mentioned that the first signal quality detecting module 120 and the first target selecting module 130 are still functioning in the meantime. Therefore, the target device to be sent with the first request packet may not be the wireless device that sends the protocol pending message.

It should be emphasized that, although the request/response packet can be in any form, in order to minimize the effort on negotiation and maximize the compatibility with existing network structure, the first transmitting module 110 could add the protocol request message to the message packet used in the conventional wireless network technology (for example but not limited to probe packets) as the request packet. Therefore, regardless running the invention or not, the target device always return a response packet. Therefore, after the first transmitting module 110 receives the first response packet, the connection processing module 160 usually has to check whether the first response packet includes a protocol response message such as 'protocol confirmed', 'protocol rejected', or 'protocol pending'. If the first response packet does not contain a protocol response message, the connection processing module 160 can execute the same procedure as when receiving a protocol rejection. That is, the first signal quality detecting module 120 ignores the target device (e.g., the second wireless device 200) when detecting the signal quality of all wireless devices. Or the first target selecting module 130 is notified to ignore the target device when selecting a new target device.

In fact, the developers of the wireless device 100 could define a private wireless network protocol. The first transmitting module 110 can sent the request packet in the private wireless network protocol to the target device and receive the response packet from the target device. The response packet received by the first transmitting module 110 can include message of 'protocol confirmed', 'protocol rejected', or 'protocol pending' or represents 'protocol confirmed', 'protocol rejected', or 'protocol pending'.

To ensure which wireless device is the most suitable device and to establish connection with it, the second wireless device 200 connects to the most suitable candidate device (e.g., the first wireless device 100). The second wireless device 200 includes a second transmitting module 210, a second signal quality detecting module 220, a second target selecting module 230, and a response generating module 250.

The second transmitting module 210 is similar to the first transmitting module 110, and transmits and receives wireless packets in the prior art periodically. The second transmitting module 210 also receives the second request packet transmitted from any wireless device on the wireless network of the second wireless device 200, and returns a second response packet containing a protocol response message to the wireless device that sends the second request packet.

The second signal quality detecting module 220 is also similar to the first signal quality detecting module 120. The second signal quality detecting module evaluates and records the signal quality of all other wireless devices in the wireless network, based on the wireless packets received by the second transmitting module 210. Generally speaking, the second signal quality detecting module 220 and the first signal quality detecting module 120 simultaneously detect signal quality of wireless devices in the wireless network other than themselves.

The second target selecting module 230 is also similar to the first target selecting module 130. The second target selecting module 230 selects a candidate device from the wireless devices recorded by the second signal quality detecting module 220, such as the first wireless device 100. The wireless device selected by the second target selecting module 230 as the candidate device has to satisfy three conditions. First, the signal quality of the candidate device must have the best signal quality among all wireless devices detected by the second signal quality detecting module 220. Secondly, the signal quality of the candidate device has to be greater than or equal to a threshold. Thirdly, the duration of the signal quality of the candidate device is not less than a threshold has to reach the first specific time.

It should be noted that if none of the wireless devices recorded by the second signal quality detecting module 220 satisfies all the above-mentioned three conditions, the second target selecting module 230 does not select a candidate device until some wireless device satisfies all the three conditions.

The response generating module 250 generates the protocol response message based on the conditions of the candidate device selected by the second target selecting module 230. If the wireless device (e.g., the first wireless device 100) sending the second request packet is the candidate device selected by the second target selecting module 230, the response generating module 250 generates the protocol response message meaning protocol confirmed. If the wireless device sending the second request packet is not the candidate device selected by the second target selecting module 230, the response generating module 250 generates the protocol response message meaning protocol rejected. If the second target selecting module 230 has not selected a candidate device, the response generating module 250 generates the protocol response message meaning protocol pending.

Figure 2:
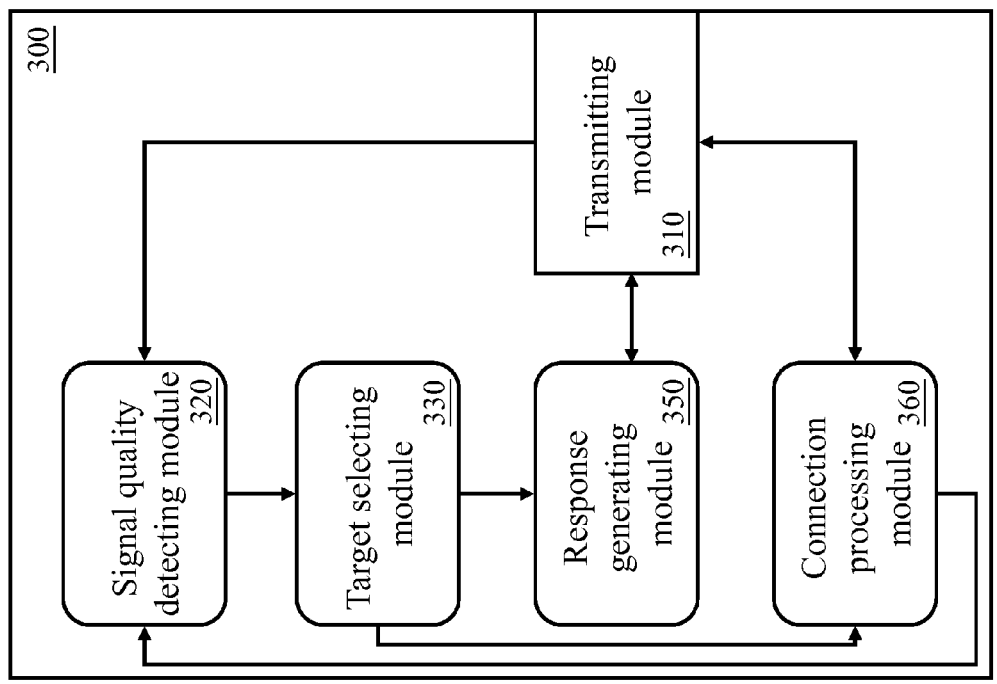
FIG. 2 shows the elements in a wireless device for selecting a connection target based on signal quality according to the invention.

According to the above description, most corresponding modules in the first wireless device 100 and the second wireless device 200 are similar. More explicitly, the first wireless device 100 and the second wireless device 200 have different subsequent processing modules for different packets. Therefore, the first wireless device 100 and the second wireless device 200 can be integrated into one wireless device 300 with both functions in practice. As shown in FIG. 2, the wireless device 300 includes a transmitting module 310, a signal quality detecting module 320, a target selecting module 330, a response generating module 350, and a connection processing module 360. The transmitting module 310 includes all the functions of the first transmitting module 110 and the second transmitting module 210. The signal quality detecting module 320 and the target selecting module 330 are similar to the first signal quality detecting module 120/the second signal quality detecting module 220 and the first target selecting module 130/the second target selecting module 230, respectively. The response generating module 350 and the connection processing module 360 are the same as the response generating module 250 and the connection processing module 160, respectively. Therefore, the modules in FIG. 2 are not explained again.

Figure 3:
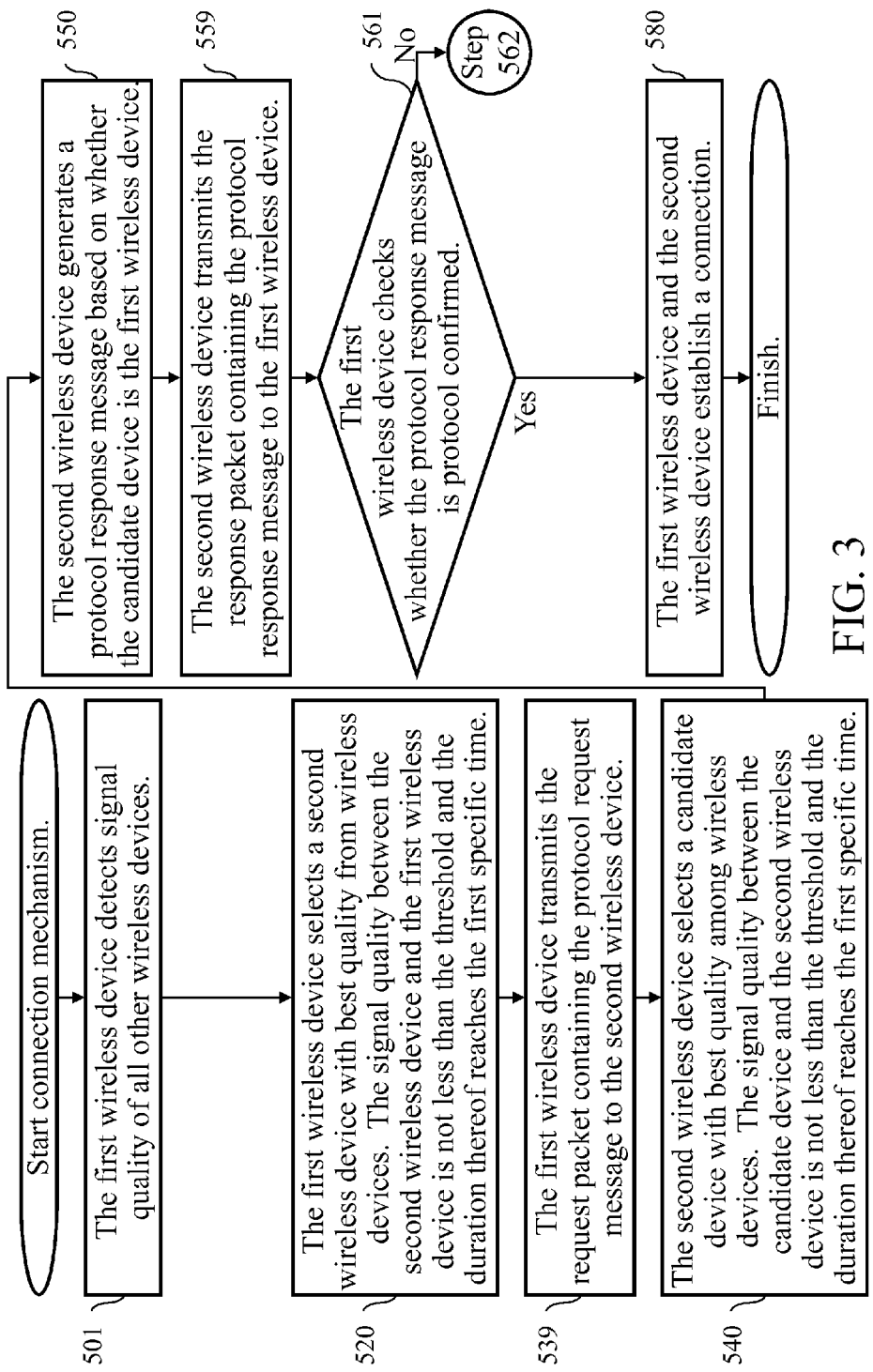
FIG. 3 is a flowchart of the method for selecting a connection target based on signal quality according to the invention.

In the following, an embodiment is used to explain the disclosed system and method. Please refer to FIG. 3 for the flowchart of the disclosed method selecting a connection target based on signal quality. In this embodiment, the invention is used on a train. As shown in FIG. 4, the disclosed wireless devices 411, 412, 421, 422, 431 are installed in carriages 410, 420, 430. The wireless device in the left of a carriage establishes a connection with the right wireless device in the left carriage, thereby building up a linear network topology on the train for passengers thereon to use. However, the invention is not restricted to this particular example.

Figure 6A:
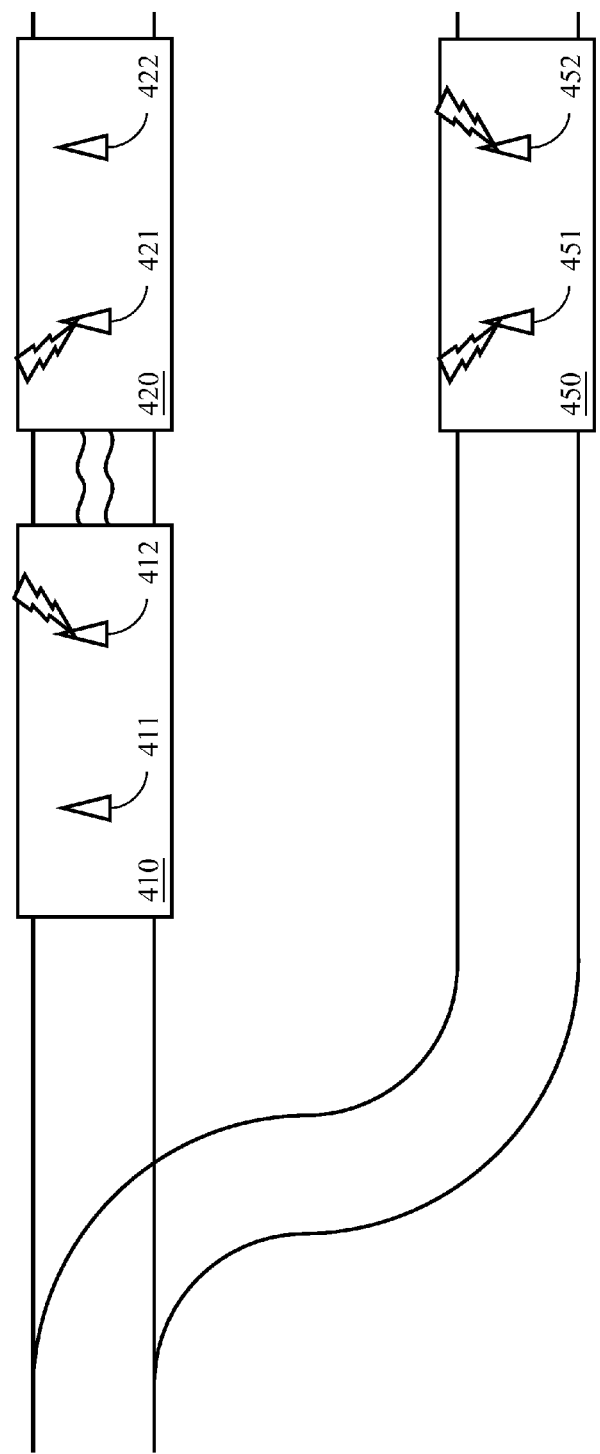
FIGS. 6A and 6B are schematic views of changing the order of carriages in an embodiment of the invention.
Figure 6B:
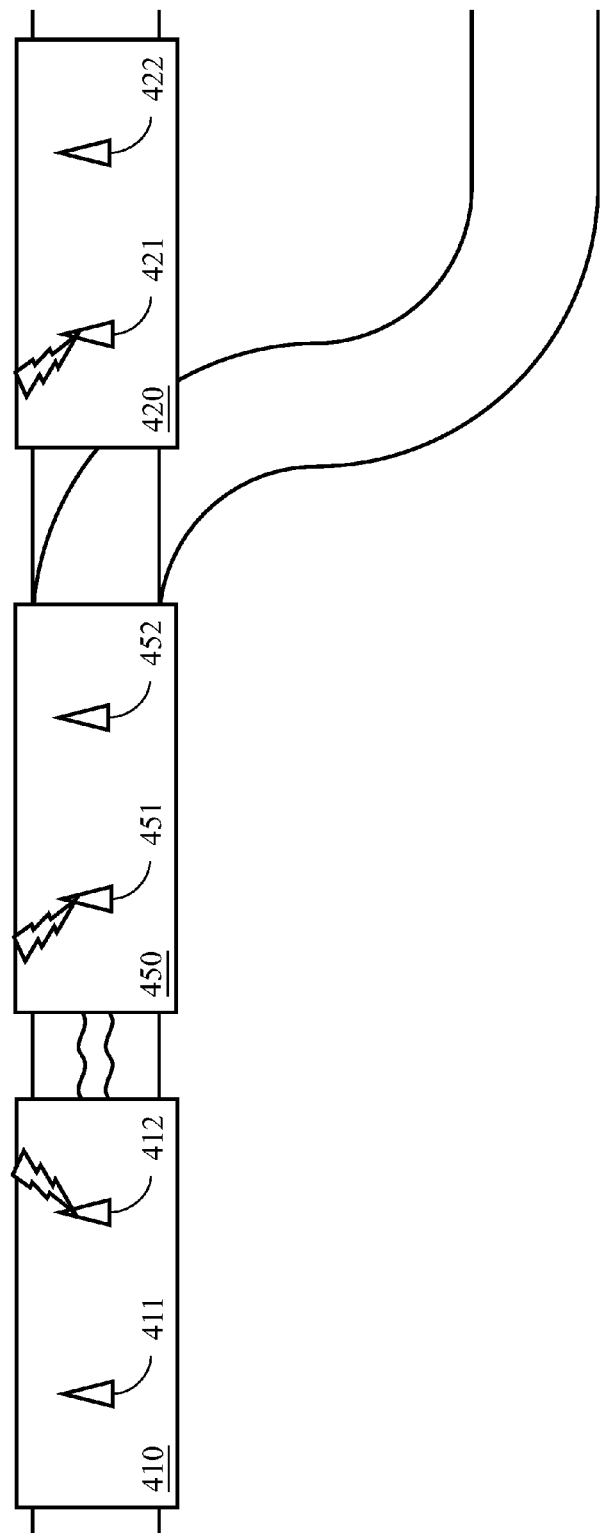

Carriages of a train can be arbitrarily arranged and connected. Suppose the carriages of a train change their orders. As shown in FIG. 6A and FIG. 6B, the originally connected carriage 410 and carriage 420 are separated. Carriage 410 is connected to carriage 450. In the prior art, one needs to modify the connection settings of the last wireless device 412 on carriage 410 and the first wireless device 451 on carriage 450 so that the wireless device 412 and the wireless device 451 can be connected. A train using the invention does not require such modifications of connection settings of the wireless devices thereon.

Please refer to FIG. 4. Suppose carriage 410 and carriage 420 are connected. After the wireless devices on the train start, they try to search other wireless devices and try to establish connections among them. We now use the process of connecting wireless devices in carriage 410 and carriage 420 as an example to explain the invention. Connections of wireless devices in other carriages are the same.

Carriage 410 is provided with two wireless devices: wireless device 411 and wireless device 412. Carriage 420 is also provided with two wireless devices: wireless device 421 and wireless device 422. Carriage 430 is also provided with two wireless devices: wireless device 431 and wireless device 432. Therefore, after wireless devices on the train start, the transmitting modules 310 thereof periodically transmit wireless packets and receive wireless packets from other wireless devices. Such wireless packets can be beacon packets. That is, the wireless device 411 receives at least wireless packets from the wireless device 412. The wireless device 412 receives at least wireless packets from the wireless device 411, the wireless device 421, the wireless device 422, and the wireless device 431. The wireless device 421 receives at least wireless packets from the wireless device 411, the wireless device 412, the wireless device 422, and the wireless device 431. The wireless device 422 receives at least wireless packets from the wireless device 412, the wireless device 421, the wireless device 431, and the wireless device 432.

Afterwards, the signal quality detecting modules 320 of the wireless devices on the train detect the signal quality of other wireless devices based on the wireless packets received by the transmitting modules 310. That is, the wireless device 411 can detect and record the signal quality of the wireless device 412. The wireless device 412 can detect and record the signal quality of the wireless device 411, the wireless device 421, the wireless device 422, and the wireless device 431. The wireless device 421 can detect and record the signal quality of the wireless device 411, the wireless device 412, the wireless device 422, and the wireless device 431. The wireless device 422 can detect and record the signal quality of the wireless device 412, the wireless device 421, the wireless device 431, and the wireless device 432.

Suppose the wireless devices on the train use some appropriate method to adjust wireless signals, such as using an oriented antenna. When the antenna of the wireless device 411 points to the train head (left), the antenna of the wireless device 412 points to carriage 420 (right), the antenna of the wireless device 421 points to carriage 410 (left), the antenna of the wireless device 422 points to carriage 430 (right), the antenna of the wireless device 431 points to carriage 420 (left), and the antenna of the wireless device 432 points to train tail (right), then the wireless device 411 may not possibly receive any wireless packets. The wireless device 412 receives at least wireless packets from the wireless device 421 and the wireless device 431. The wireless device 421 receives at least wireless packet from the wireless device 412. The wireless device 422 receives at least wireless packets from the wireless device 431. Therefore, the wireless device 411 does not record the signal quality of any wireless devices. The wireless device 412 can detect and record the signal quality of the wireless device 421 and the wireless device 431. The wireless device 421 can detect and record the signal quality of the wireless device 412. The wireless device 422 can detect and record the signal quality of the wireless device 431.

The following description supposes the front wireless device 421 of carriage 420 is the first wireless device. In this embodiment, the RSSI is used as the signal quality. After the signal quality detecting module of the wireless device 421 detects the RSSI (signal quality) between the wireless device 421 and other wireless device (step 501), the target selecting module of the wireless device 421 can select a wireless device with the largest RSSI (best signal quality), the signal quality is not less than a threshold, and the duration of the signal quality is not less than the threshold reaching the first specific time (step 520). The selected wireless device is used as the target device (second wireless device). In this embodiment, if the wireless device 421 detects that the wireless device 412 has the best signal quality and the duration for being over a threshold also reaches the first specific time, then the wireless device 421 selects the wireless device 412 as the target device, i.e., the second wireless device of the invention.

After the target selecting module of the wireless device 421 selects the target device, the connection processing module thereof can send a request packet containing a protocol request message via the transmitting module to the target device (step 539). In this embodiment, the request packet is assumed to be a probe request packet. Thus, the wireless device 421 sends a probe request packet containing the protocol request message to the wireless device 412. The connection processing module of the wireless device 421 first packages the protocol request message into the request packet before sending the request packet to the target device. The request packet transmitted by the transmitting module of the wireless device 421 thus includes the protocol request message.

At the same time, the signal quality detecting module of the wireless device 412 also detects the signal quality of other wireless devices. Afterwards, the target selecting module of the wireless device 412 can select a wireless device with the best signal quality, the signal quality is not less than a threshold, and the duration of the signal quality is not less than a threshold reaching the first specific time (step 540). The selected wireless device is used as the candidate device. In this embodiment, suppose the wireless device 412 can detect the signal quality of the wireless device 421 and the wireless device 431. Since the wireless device 421 is closer to the wireless device 412 than the wireless device 431, the one with the best signal quality as detected by the wireless device 412 is the wireless device 421. If the duration of the signal quality of the wireless device 421 as detected by the wireless device 412 is not less than a threshold and reaches the first specific time, the wireless device 412 always selects the wireless device 421, instead of the wireless device 431, as the candidate device regardless whether the duration of the signal quality of the wireless device 431 is not less than a threshold and reaches the first specific time. In practice, the wireless device 421 is a target device for the wireless device 412.

After the transmitting module of the target device (i.e., the wireless device 412) receives the request packet containing the protocol request message sent from the wireless device 421, the response generating module of the target device can generate a corresponding protocol response message based on whether the candidate device selected by the target selecting module of the target device is the first wireless device (step 550). In this embodiment, the candidate device selected by the target selecting module of the target device is indeed the first wireless device (the wireless device 421). Therefore, the response generating module of the target device can follow the procedure in FIG. 5 to first determine that the target device has selected the candidate device (step 551), then to determine that the first wireless device is the candidate device selected by the target selecting module (step 555), and to generate a protocol response message meaning protocol confirmed (step 557).

After the response generating module of the target device generates the protocol response message, the transmitting module of the target device can send a response packet containing the protocol response message back to the candidate device, the first wireless device 421 (step 559). The response generating module of the target device can first package the protocol response message meaning protocol confirmed into the response packet before sending the response packet to the first wireless device according to wireless network technology. Thus, the response packet transmitted by the transmitting module of the wireless device contains the protocol response message.

After the transmitting module of the first wireless device (the wireless device 421) receives the response packet returned by the target device (the wireless device 412), the wireless device 421 checks the contents of the protocol response message in the response packet (step 561). In this embodiment, the protocol response message contained in the response packet means protocol confirmed. Thus the connection processing module of the wireless device 421 can establish a connection with the target device, i.e., the wireless device 412 (step 580). The connection processing module of the wireless device 421 can use the device information (e.g., MAC address) thereof and the device information (also MAC address) of the target device (the wireless device 412) recorded in the response packet to determine whether to actively establish the connection with the wireless device 412. Using this mechanism, the invention can determine whether the wireless device acts as an access point (AP) or a client without employing additional messages. Besides, the AP and the client can use the information obtained during the protocol request and protocol response processes to generate a unique connection parameter shared only between the AP and the client. For example, the original SSID is appended with the last three digits of the MAC address of the AP or the connection confirmation password is modified. Therefore, any pair of wireless devices with an agreed protocol are using unique connection information, preventing the client from connecting to the wrong AP.

Afterwards, whether the wireless device 421 actively or passively connects to the wireless device 412, carriage 410 and carriage 420 can always establish the connection.

The following uses a second embodiment to explain the disclosed system and method. Please continue to refer to FIG. 3. The current embodiment follows the first embodiment. However, carriages of the train in this embodiment are rearranged. As shown in FIGS. 6A and 6B, carriage 410 departs from carriage 420 and connects to carriage 450.

After carriage 410 departs from carriage 420 and before carriage 410 connects to carriage 450, the wireless device 451 and the wireless device 452 on carriage 450 are initiated. Suppose the signal quality detecting module of the wireless device 451 can detect the signal quality of the wireless device 421 (step 501). If the duration of the signal quality of the wireless device 421 detected by the signal quality detecting module of the wireless device 451 no less than a threshold reaches the first specific time, the target selecting module of the wireless device 451 can select the wireless device 421 (step 520) and use the selected wireless device 421 as the target device.

After the target selecting module of the wireless device 451 selects the target device (the wireless device 421), the connection processing module of the wireless device 451 can transmit the request packet containing the protocol request message via the transmitting module to the target device (i.e., the wireless device 421) (step 539).

After the transmitting module of the target device (i.e., the wireless device 421) receives the request packet containing the protocol request message sent from the wireless device 451, the response generating module of the wireless device 421 can generates a protocol response message based on whether the candidate device selected by the target selecting module of the target device is the first wireless device (step 550). In this embodiment, the candidate device selected by the target selecting module of the target device is indeed the wireless device 412 instead of the wireless device 451 that sends the request packet. Therefore, the response generating module of the target device can follow the procedure shown in FIG. 5 to generate a protocol response message meaning protocol rejected (step 556).

After the response generating module of the target device (the wireless device 421) generates the protocol response message, the transmitting module thereof can return the response packet containing the protocol response message to the wireless device that sends the protocol request message, i.e., the wireless device 451 (step 559).

Figure 7A:
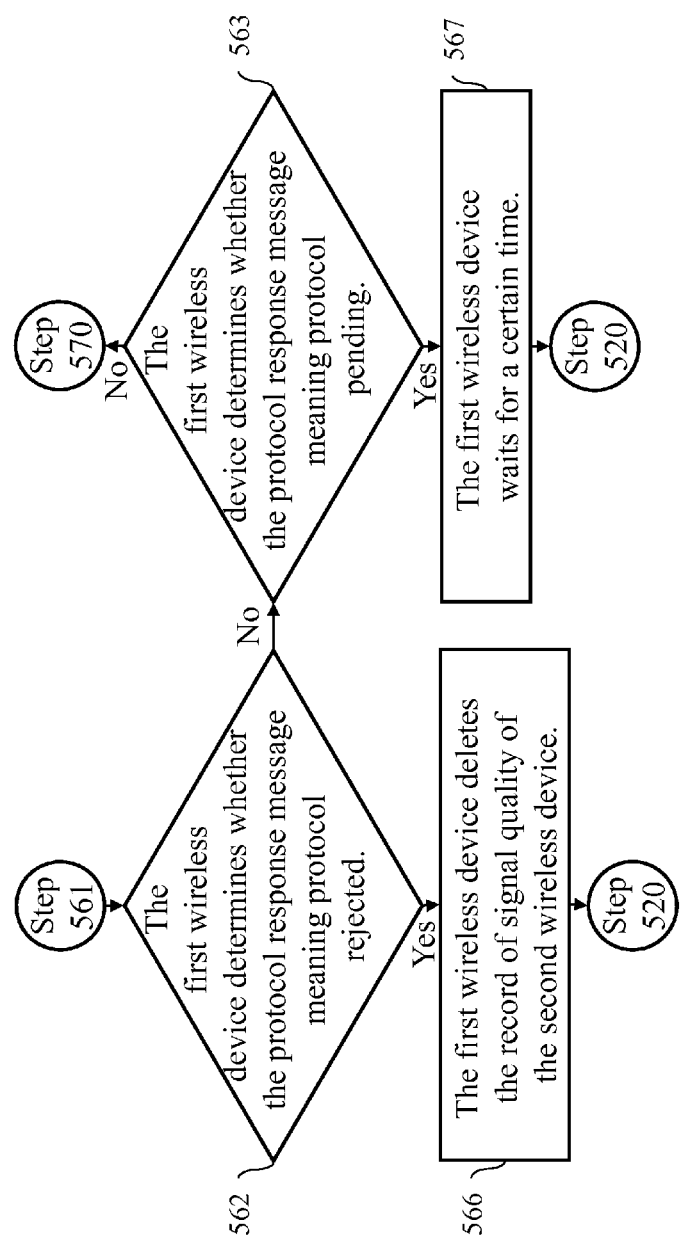
FIG. 7A is a flowchart of checking the protocol response message according to the invention.

After the transmitting module of the wireless device 451 receives the response packet returned from the target device (the wireless device 421), the wireless device 421 can check the contents of the protocol response message in the response packet (step 561). In this embodiment, the protocol response message in the response packet means protocol rejected. Therefore, after the connection processing module of the wireless device 421 follows the procedure of FIG. 7A to determine that the protocol response message means protocol rejected (step 562), the signal quality detecting module of the wireless device 451 deletes the signal quality record of the wireless device 421 (step 566).

Figure 7B:
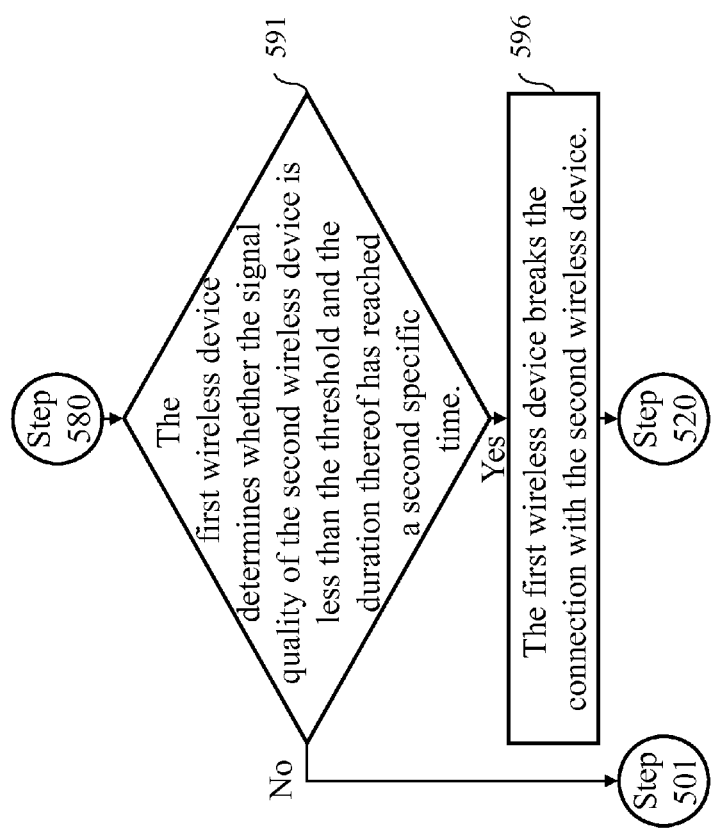
FIG. 7B is a flowchart of selecting the connection target based on signal quality according to the invention.

Afterwards, as carriage 410 departs from carriage 420, the connection processing module of the wireless device 412 follows the procedure shown in FIG. 7B to determine whether the duration of the signal quality of the wireless device 421 is less than a threshold and whether the time of signal quality less than the threshold has reached a second specific time (step 591). When the connection processing module of the wireless device 412 determines that the duration of the signal quality of the wireless device 421 being less than a threshold has reached the second specific time, the connection processing module of the wireless device 412 can break the connection with the wireless device 421 (step 596). The target selecting module of the wireless device 412 is notified to select a new target device (step 520).

When carriage 450 slides along the track to between carriage 410 and carriage 420, the signal quality detecting module of the wireless device 412 detects that the signal quality of the wireless device 451 becomes better. When the target selecting module of the wireless device 412 determines that the signal quality of the wireless device 451 is not less than a threshold and has reached the first specific time, the wireless device 451 is selected (step 520) as the new target device.

After the target selecting module of the wireless device 412 selects the target device (the wireless device 451), the connection processing module of the wireless device 412 can transmit the request packet containing the protocol request message via the transmitting module to the target device (step 539), i.e., the wireless device 451.

After the transmitting module of the target device (the wireless device 451) receives the request packet containing the protocol request message sent from the wireless device 412, the response generating module of the wireless device 451 can generate the corresponding protocol response message based on whether the candidate device selected by the target selecting module of the target device is the wireless device 412 (step 550). In this embodiment, suppose the candidate device selected by the target selecting module of the wireless device 451 is indeed the wireless device 412. Therefore, the response generating module of the wireless device 451 can follow the procedure in FIG. 5. The response generating module of the wireless device 451 first generates a protocol response message meaning protocol confirmed (step 557), then sends the response packet containing the protocol response message via the transmitting module of the wireless device 451 to the wireless device that sends the protocol request message, i.e., the wireless device 412 (step 559).

After the transmitting module of the wireless device 412 receives the response packet returned from the target device (the wireless device 451), the wireless device 412 can check the contents in the protocol response message of the response packet (step 561). In this embodiment, the protocol response message in the response packet means protocol confirmed. Therefore, the connection processing module of the wireless device 412 can establish a connection with the target device, i.e., the wireless device 451 (step 580). And the connection between carriage 410 and carriage 450 can be successfully accomplished without modifying settings of the wireless devices thereof, achieving the goal of automatically update the topology. In other words, this invention provides a mechanism to automatically adjust topology.

In the above-mentioned embodiment, if the target selecting module of the wireless device 451 has not selected a candidate device (step 551), the response generating module of the wireless device 451 generates a response message meaning protocol pending (step 552) and sends the response packet containing the protocol response message via the transmitting module of the wireless device 451 to the wireless device 412 that sends the protocol request message (step 559).

After the transmitting module of the wireless device 412 receives the response packet returned from the target device (the wireless device 451), the wireless device 412 can determine that the protocol response message contained in the response packet means protocol pending (step 563). After waiting a period of time (step 567), the target selecting module of the wireless device 412 reselects a target device with the best signal quality and the duration of the signal quality is not less than a threshold reaching the first specific time (step 520) until carriage 410 and carriage 450 establishes a connection.

Figure 8:
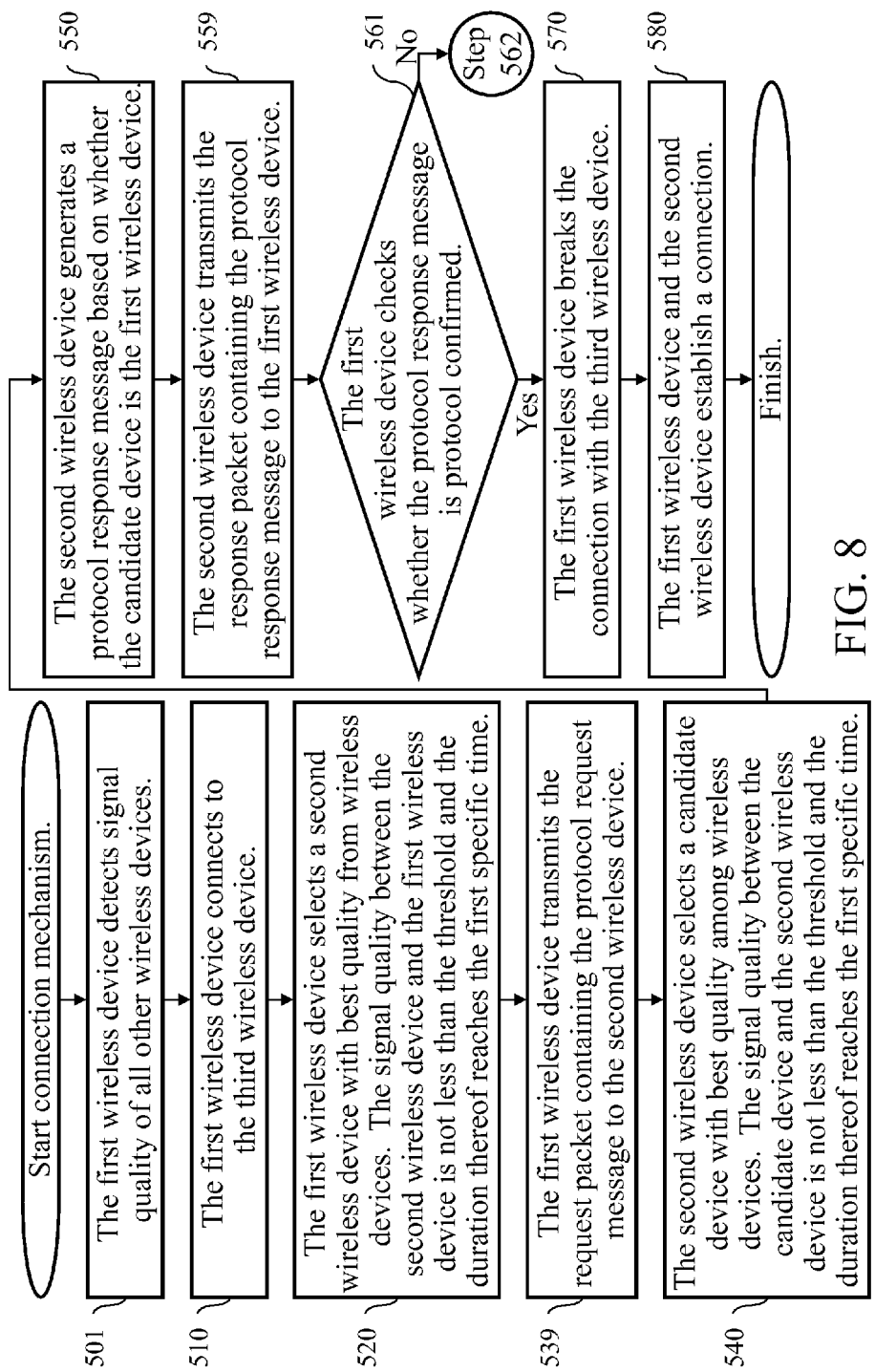
FIG. 8 is another flowchart of selecting the connection target based on signal quality according to the invention.

The following uses a third embodiment to explain the disclosed system and method. Please refer to FIG. 8 for a flowchart. This embodiment follows the second embodiment, with emphasis on elucidating the process of another connection switch.

In this embodiment, suppose the distance between carriage 410 and carriage 420 becomes larger. At the same time, carriage 450 moves along the track toward carriage 410. When carriage 450 moves to between carriage 410 and carriage 420, if the connection between the wireless device 412 in carriage 410 and the wireless device 421 in carriage 420 is still not broken, i.e., the wireless device 412 and the wireless device 421 are still connected (step 510).

The transmitting module of the wireless device 421 continuously receives wireless packets. That is to say, the signal quality detecting module of the wireless device 421 continuously detects the signal quality of all the wireless devices (step 501). The signal quality of the wireless device 452 becomes better as carriage 450 gets closer, whereas the signal quality of the wireless device 412 becomes worse as carriage 410 gets farther away. The target selecting module of the wireless device 421 can select the wireless device 452 as the new target device after the duration of the signal quality of the wireless device 452 being not less than a threshold is determined to have reached the first specific time (step 520).

After the target selecting module of the wireless device 421 selects the new target device (the wireless device 452), the connection processing module of the wireless device 421 can send the request packet containing the protocol request message to the target device, i.e., the wireless device 452 (step 539).

After the transmitting module of the target device (the wireless device 452) receives the request packet containing the protocol request message from the wireless device 421, the response generating module of the wireless device 452 can generates the corresponding protocol response message based on whether the candidate device selected by the target selecting module of the target device is the wireless device 421 (step 550). In this embodiment, suppose the candidate device selected by the target selecting module of the wireless device 452 is indeed the wireless device 421. The response generating module of the wireless device 452 can follow the procedure of FIG. 5 to generate a protocol response message meaning protocol confirmed (step 557).

After the response generating module of the wireless device 452 generates the protocol response message, the transmitting module of the wireless device 452 can send the response packet containing the protocol response message back to the wireless device that sends the protocol request message, the wireless device 421 (step 559).

After the transmitting module of the wireless device 421 receives the response packet returned from the target device (the wireless device 452), the wireless device 421 can check the contents of the protocol response message contained in the response packet (step 561). In this embodiment, the protocol response message contained in the response packet means protocol confirmed. Therefore, the connection processing module of the wireless device 421 can first break the connection with the wireless device 412 (step 570) and establish a connection with the target device, the wireless device 452 (step 580). As a result, the wireless devices on carriage 410 and carriage 450 accomplish a connection without modifying settings of the wireless devices, automatically updating the topology. Likewise, the wireless device 412 can first break the connection with the wireless device 421 and then connect to the wireless device 451 between carriage 410 and carriage 450. In this way, the wireless devices can adjust the best topology automatically.

In summary, the invention differs from the prior art in that the wireless device selects as the candidate device another wireless device with the best signal quality and the duration of the signal quality is not less than a threshold reaching the specific time. If the selected candidate device also selects the wireless device, the two wireless devices establish a unique connection. Using this technique, the invention solves the problem in the prior art that wireless devices cannot establish a stable linear topology in a dynamical and complicated environment. With the invention, wireless devices automatically establish a stable linear topology in a dynamical and complicated environment, and update the topology timely to adapt to environmental changes.

Moreover, the disclosed method for selecting a connection target based on signal quality can be implemented in hardware, software or the combination thereof. It can also be implemented in a centralized way in a computer system or in a distributive way among several connected computer systems.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for selecting a connection target based on signal quality for two wireless devices of a plurality of wireless devices to establish a unique connection, the method comprising the steps of:
   detecting signal quality of all other wireless devices at a first wireless device;
   selecting a second wireless device with best signal quality from the wireless devices by the first wireless device when the signal quality between the first wireless device and the second wireless device lasts for a first specific time that is not less than a threshold;
   sending a request packet containing a protocol request message from the first wireless device to the second wireless device;
   selecting a candidate device from the wireless devices by the second wireless device when signal quality between the candidate device and the second wireless device lasts for the first specific time;
   generating a protocol response message by the second wireless device if the candidate device is the first wireless device;
   sending a response packet containing the protocol response message from the second wireless device to the first wireless device; and
   establishing a connection between the first wireless device and the second wireless device when the first wireless device checks the protocol response message indicates protocol confirmation.

2. The method of claim 1 further comprising steps of
   connecting the first wireless device with a third wireless device before selecting a second wireless device and
   breaking the connection between the first wireless device and the third wireless device before establishing the connection between the first wireless device and the second wireless device.

3. The method of claim 1 further comprising steps of
   breaking the connection between the first wireless device and the second wireless device when the signal quality of the second wireless device lasts for a second specific time that is not less the threshold and
   selecting third wireless device with the best signal quality from the wireless devices as the second wireless device.

4. The method of claim 1, wherein the connection between the first wireless device and the second wireless device is pending if the candidate device is not found and the protocol response message indicates protocol pending.

5. The method of claim 1, wherein the connection between the first wireless device and the second wireless device is achieved based on unique connection information generated by the first wireless device or the second wireless device based on device information of the first wireless device and device information of the second wireless device.

6. The method of claim 1 further comprising steps of
   preventing the selection of the candidate device for a certain time when the protocol response message indicates protocol rejection
   selecting wireless device with best signal quality as the second wireless device continuously and
   sending the request packet to the selected second wireless device after the certain time and when the first wireless device receives the protocol response message indicating protocol pending.

7. The method of claim 1 further comprising a step of
   preventing the selection of the candidate device for a certain time when the first wireless device determines that the response packet does not contain the protocol response message before establishing the connection between the first wireless device and the second wireless device.

8. A system for selecting a connection target based on signal quality of a plurality of wireless devices to establish a unique connection, comprising:
   a first wireless device detect signal quality from a plurality of wireless devices and select wireless device with best signal quality from the wireless devices as a target device, wherein the signal quality between the target device and the first wireless device lasts for a first specific time not less than a threshold, and send a request packet containing a protocol request message; and
   a second wireless device as the target device detect signal quality of the wireless devices, select third wireless device with best signal quality from the wireless devices as a candidate device, wherein the signal quality between the candidate device and the second wireless device lasts for the first specific time, receive the protocol request message generat a corresponding protocol response message based on whether the first wireless device is the candidate device, and send a response packet containing the protocol response message to the first wireless device wherein the second wireless device determines that the first wireless device is the candidate device when the protocol response message indicates protocol confirmation; the second wireless device determines that the first wireless device is not the candidate device when the protocol response message indicates protocol rejection; the second wireless device has not found the candidate device, when the protocol response message indicates protocol pending; the first wireless device establishes the connection with the second wireless device when the first wireless device determines that the protocol response message indicates the protocol confirmation; the first wireless device prevents the selection of the second wireless device as the target device for a certain time when the first wireless device determines that the protocol response message indicates the protocol rejection and continues to select a new target device among the other wireless devices as the second wireless device; and the first wireless device re-sends the request packet to the selected second wireless device after a certain time when the first wireless device determines that the protocol response message indicates protocol pending.

9. The system of claim 8, wherein the first wireless device breaks the connection with the second wireless device when the signal quality of the second wireless device lasts a second specific time not less than the threshold, and sends the request packet to the newly selected second wireless device.

10. The system of claim 8, wherein the first wireless device determines whether to connect to the second wireless device or to wait for the second wireless device to connect based on the device information of the second wireless device in the response packet.

11. The system of claim 8, wherein the first wireless device uses unique connection information to connect to the second wireless device, the connection information being generated by the first wireless device or the second wireless device based on device information of the first wireless device and device information of the second wireless device.

12. The system of claim 8, wherein the first wireless device prevents the selection of the second wireless device as the target device when the first response packet does not contain a protocol response message.

13. The system of claim 8, wherein the first wireless device breaks connections to other wireless devices before connecting to the second wireless device.

14. A wireless device for selecting a connection target based on signal quality, comprising:
  a signal quality detecting module for detecting signal quality of all other wireless devices;
  a target selecting module for selecting wireless device with best signal quality from all the wireless devices as a candidate device, wherein the signal quality between the candidate device and the wireless device lasts a certain time not less than a threshold;
  a transmitting module for transmitting a first request packet containing a first protocol request message to the candidate device, for receiving a first response packet containing a first protocol response message from the candidate device, for receiving a second request packet containing a second protocol request message, and for returning a second response message containing a second protocol response message;
  a response generating module generat the second protocol response message protocol confirmation the wireless device sending the second request packet is the candidate device, to generate the second protocol response message protocol rejection when the wireless device sending the second request packet is not the candidate device, and to generat the second protocol response message protocol pending when the target selecting module has not selected the candidate device; and
  a connection processing module to determine the first protocol response message, wherein the connection processing module connects with the candidate device when the first protocol response message indicates protocol confirmation, the signal quality detecting module deletes the record of the signal quality of the candidate device or the target selecting module does not select the wireless device transmitting the first protocol response message as the candidate device within a certain time when the first protocol response message indicates protocol rejection, and the connection processing module re-sends the first request packet via the transmitting module to the candidate device currently selected by the target selecting module after a certain time when the first protocol response message indicates that the protocol pending.

15. The wireless device of claim 14, wherein the connection processing module breaks the connection with the candidate device when the signal quality of the candidate device lasts a second specific time that is less than the threshold, the transmitting module sends the first request packet to one wireless device with best signal quality among the wireless device as selected by the target selecting module.

16. The wireless device of claim 14, wherein the connection processing module determines whether to connect to the candidate device or to wait for the candidate device to connect based on the device information of the candidate device in the response packet.

17. The wireless device of claim 14, wherein the connection processing module uses unique connection information to connect with the candidate device, the connection information being generated by the connection processing module or the candidate device based on the device information of the wireless device and the device information of the candidate device.

18. The wireless device of claim 14, wherein the signal quality detecting module deletes the record of the signal quality of the candidate device after the connection processing module determines that the first response packet does not contain the protocol response message.

19. The wireless device of claim 14, wherein the target selecting module does not select the candidate device within a certain time after the connection processing module determines that the first response packet does not contain the protocol response message.

20. The wireless device of claim 14, wherein the connection processing module breaks connections of the wireless device to other wireless devices before connecting to the candidate device.

* * * * *